US006487588B1

(12) United States Patent
Phillips et al.

(10) Patent No.: US 6,487,588 B1
(45) Date of Patent: Nov. 26, 2002

(54) WEB BROWSER WHICH AUTOMATICALLY LOADS SELECTED TYPES OF GRAPHICS

(75) Inventors: William F. Phillips, Owego, NY (US); Joan M. Reester, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 08/717,668

(22) Filed: Sep. 23, 1996

(51) Int. Cl.[7] ............................................. G06F 15/173

(52) U.S. Cl. ..................................................... 709/218

(58) Field of Search ................................ 345/333, 334, 345/335, 339, 116, 357; 395/200.33, 200.47, 200.48, 200.49; 707/500, 501, 526, 540

(56) References Cited

U.S. PATENT DOCUMENTS

| | | | |
|---|---|---|---|
| 5,359,344 A | | 10/1994 | Inoue et al. |
| 5,432,903 A | | 7/1995 | Frid-Nielsen |
| 5,436,637 A | * | 7/1995 | Gayraud et al. ............ 345/116 |
| 5,517,605 A | | 5/1996 | Wolf |
| 5,524,201 A | | 6/1996 | Schwarts et al. |
| 5,572,643 A | * | 11/1996 | Juson ......................... 395/793 |
| 5,659,729 A | * | 8/1997 | Nielsen ....................... 395/603 |
| 5,737,619 A | * | 4/1998 | Judson ........................ 395/761 |
| 5,790,793 A | * | 8/1998 | Higley .................. 395/200.48 |

FOREIGN PATENT DOCUMENTS

| | | |
|---|---|---|
| EP | 658859 | 6/1995 |
| EP | 0 757 309 A2 | 2/1997 |
| WO | 9532462 | 11/1995 |
| WO | 97/42576 | 11/1997 |

OTHER PUBLICATIONS

Yahoo.com web page printout.*
Sysnet.net web page printout.*
McArthur, Douglas, World Wide Web & HTML, Dr. Dobb's Journal, v. 19, n 15, p 18(7), Dec. 1994.*
Davidson, Andrew, Clickable Images in HTML, Dr. Dobb's Journal, v 20, n 9, p 18–20, 22, 24, 27, Sep. 1995.*
Kronick, Scott, "Netscape Navigator Hanbook", Netscape Communications Corporation, Apr. 1995.*
Research Disclosure (RD–385002) 5/96 (0627) 1p (Abstract).
Technical Disclosure Bulletin vol. 39, No. 5, 5/96 (ITIRC Printout).
Technical Disclosure Bulletin vol. 39, No. 1 01–96 (ITIRC Printout).

(List continued on next page.)

*Primary Examiner*—David Hudspeth
*Assistant Examiner*—Angel Castro
(74) *Attorney, Agent, or Firm*—Arthur J. Samodovitz

(57) ABSTRACT

A computer system selectively loads graphics for a web page. The user selects graphics on, graphics off or necessary graphics. In response to the user selection of graphics on, the system automatically selects to display a web page with regular text and graphics associated with the web page. In response to the user selection of graphics off, the system selects to display a web page with regular text, without graphics and with alternate text, if any, for the graphics. In response to user selection of necessary graphics, the system selects to display a web page with regular text, without nonclickable graphics, without clickable graphics that have alternate text, with the alternate text, and with clickable graphics that do not have alternate text. Thus, all graphics necessary to know the consequence of selecting a hot link are displayed. Also, the system displays background images, if any, which are necessary for text readibility.

18 Claims, 8 Drawing Sheets

OTHER PUBLICATIONS

An—4896860—INSPEC Abstract.
AN—5306152—INSPEC Abstract.
CR995005—ITIRC Printout.
EN996037—ITIRC Printout.
RP995041—ITIRC Prinout.
CR995005—ITIRC Printout.

* cited by examiner http://text.html

Joan Reester

*Last Update* - September 06th, 1996

RESUME joan_in_ny@vnet.ibm.com (Internal MCCAMBRI at GDLVM7)   ■ Photo not displayed...

607-752-6335 (Internal 852-6335)                         123

Most Used and Favorite Links
No Photo Available for me...Here is my son Jason http://text.html

Joan Reester

*Last Update* - September 06th, 1996

RESUME joan_in_ny@vnet.ibm.com (Internal MCCAMBRI at GDLVM7)

607-752-6335 (Internal 852-6335)

Most Used and Favorite Links
No Photo Available for me...Here is my son Jason

■ Photo not displayed...
123

WEB BROWSER WHICH AUTOMATICALLY LOADS SELECTED TYPES OF GRAPHICS

BACKGROUND OF THE INVENTION

The invention relates generally to web browsers for the World Wide Web (WWW) and deals more particularly with a web browser which automatically loads selected types of graphics from a server to a client.

The WWW is well known and comprises a multitude of computer servers, respective data bases and a network by which clients can communicate with the servers and request and load the data. A server may directly manage its own data base and access other, remote data bases on behalf of a client user. The client typically includes a "web browser" to provide a user interface to the WWW.

The server presents the data to the user as "web pages" and each web page is represented by a "URL" address. The URL comprises an access method/protocol such as http as a prefix, a server name or "home page" and the data type, if any, as a suffix. The server name typically includes a "domain name" which is the name of a company, educational institution or other organization that owns the server. There are different ways that a client can access a web page. If the client knows the server name and data type suffix, if any, the client can directly request the web page from the server. However, if the client only knows the server name, the client can address the server name, and in response, the server will present the "home page" for the server. The home page, as well as other web pages, typically include text or graphics which serve as links to other web pages. The links are termed "hot links" or "click points".

For those web pages for which the user does not know at least the server name, there are different types of search engines, such as key word search engines and catalog search engines, to identify a server and/or web page of interest.

After the user identifies a web page of interest, the server may load the web page to the user's client machine. The web page loaded to the client is represented by an html file and comprises a specification of each component of the web page—regular text (i.e. text other than alternate text), graphics, alternate text, the nature of the component and whether each text or graphic is clickable, i.e. a link to another web page. The format of html is an industry standard and is further defined in "HTLL for Fun and Profit" by Mary E. S. Morris published in 1995 by SunSoft Press, A Prentice Hall title. In the case of text, the html defines the actual text and its location on the web page. However, in the case of graphics, the html does not define the graphics itself but instead specifies a pointer to other files which actually define the graphics. Some of the graphics are complex. While the graphics add meaning to the web page and can serve as click points, they are often time consuming to load. To minimize load time, existing web browsers permit the user to request a web page without graphics. In such a case, the web browser displays simple icons instead of the respective graphics and does not load any background images. Typically, if the graphic was clickable, so is the simple icon which substitutes for the graphic; however, the simple icon does not provide any information as to the nature of the link or whether the graphic had multiple click points or links. In some cases, the html specifies "alternate" text which substitutes for a graphic if the user opts not to download the graphic, and this alternate text is clickable and provides information as to the nature of the link. However, the alternate text will only provide one clickable link even if there were multiple click points on the original graphic.

The flow chart of FIG. 1 illustrates a known web browser which permits a user to request a web page with or without graphics. In step 100, the user sets web browser parameters including graphics "on" or "off", and then requests a web page by URL address using http access method (step 102). The server responsible for that URL then loads the web page html to the client using http access method (step 104).

FIG. 2 illustrates a web page 105 with graphics on. Web page 105 includes graphics 108, 110, 112 and 114, regular text 116, 118, 120, 122, 124 and 126 and simple horizontal lines 119, 127 and 130. Graphics 112 and 114 are clickable, i.e. when graphics 112 and 114 are selected with a mouse or otherwise, client 210 sends a corresponding URL address onto the web to request the corresponding web page. Graphics 108 and 110 are not clickable. As described in more detail below, graphics 110 and 114 include alternate text, but the alternate texts are not illustrated in FIG. 2 because graphics are on for FIG. 2. Text 124 is also clickable.

FIG. 3 illustrates the same web page 105 with graphics off. Simple envelope icons 121, 123, 125 and 127 substitute for the respective graphics 108, 110, 112 and 114 of FIG. 2. However, in the cases of graphics 110 and 114, the alternate texts "photo not displayed . . . " and "Resumes", respectively, from the html are displayed within the simple icons.

The following is the html for web page 105 (and if used to generate the displays of FIG. 2, FIG. 3 and FIG. 6).

133. <HTML>
135. <HEAD>
137. <TITLE>Joans's home page</TITLE>
139. </HEAD>
140. <CENTER><H1>Joan Reester</H1></CENTER>
141. <CENTER><b>i>Last Update—</i></b><tt>September 06th, 1996</tt></CENTER>
142. <p><br>
143. <center><h3><IMG SRC="pics/icons/smiley.gif">
148. RESUME </h3></center>
149. <hr>
150. <IMG src="jason.gif" border=0 align=right ALT= "Photo not displayed . . . ">
152. Joan_in_ny@vnet.ibm.com (Internal MCCAMBRI at GDL VM7) <br>
154. <P>
160. 607-752-6335 (Internal 852-6335) <br><br><p>
170. <a href="quicklist.html"> Most Used and Favorite Links </a><br CLEAR=ALL>
180. <RIGHT>No Photo Available for me . . . Here is my son Jason</RIGHT><HR><br>
186. <A HREF="people.htm">< IMG SRC= "people2.jpg" WIDTH=100 HEIGHT=56></A>
188. <A HREF="resumes.htm">< IMG SRC= "resumes2.jpg" WIDTH=100 HEIGHT=56 ALT= "Resumes"></A><br><HR></BODY></HTML>

The first entry 133 "<html>" indicates that this is an html. The next entry 135 "<head>" indicates page header. The next entry 137 begins with a tag "<title>" which indicates that the subsequent text is a title of the web page used for print job name and quicklist. The next entry 139 is the tag </head> which indicates end of page header. The next entry 140 begins with the tag <center><h1> and indicates the subsequent text should be centered. Likewise the next entry 141 begins with the tag <center> and indicates that the subsequent text should be centered. The next entry 142 comprises the tag <p><br> which indicates paragraph and break. The next entry 143 begins with the <center> format tag and also includes a tag <IMG SRC which indicates that the following file names the graphic 108. Entry 148 indicates the text "RESUME" (109 in FIG. 2) and the center format. The next entry 149 in the html is "<hr>" which means horizontal rule, i.e. straight line 119. The next entry 150 describes non-clickable graphic 110. <IMG src="jason.gif" is the URL for the source of the graphic itself. "Border=0" and "align=right" specify the border and alignment characteristics of the graphic 110. The next entry 152 is for nonclickable text 120. The next entry 154 means a paragraph. The next entry 160 is for nonclickable text 122. Entry 170 begins with tag "<a>" which means that the subsequent text 124 is clickable. Entry 180 is for nonclickable text 126. Entry 186 is for clickable graphic 112, which does not include any alternate text. Entry 188 is for clickable graphic 114, and includes alternate text "Resumes".

After receiving the html, the web browser displays the regular text, clickable text or regular text (but not alternate text) and horizontal lines of the web page (step 105). Next, the web browser determines if there is a graphic yet to be read from the html (decision 106). This is done by scanning down the html looking for a "IMG" tag. If not, then the display is complete (step 107). However, if there is a graphic yet to be displayed, the web browser reads the web browser parameters entered in step 100 to determine if this user has requested the web page with graphics or without graphics, i.e. "graphics on" or "graphics off", respectively (decision 110). In the former case, i.e. "graphics on", the web browser reads the file name of the first graphic from the html (step 111). In the illustrated example, the first graphic is graphic 108, and graphic 108 is defined by the file name "pics/icons/smiley.gif". Then, the web browser loads the graphic from the URL indicated by the pointer (step 112). Then, the web browser displays the first graphic on the web page along with the text and horizontal lines that were previously displayed in step 105 (step 114). If the html specifies another graphic (decision 106), then the client repeats steps 110, 111, 112 and 114 until all graphics are displayed.

Referring again to decision 110, if the web browser parameters indicate "graphics off" (instead of "graphics on" as previously discussed), then after the web browser displays the regular text of the web page in step 105, the web browser identifies the first graphic, reads the specification of the first graphic (step 118) and determines if alternate text is specified (decision 120). If so, as is the case for graphics 110 and 114, the client displays the respective alternate text "Photo not displayed . . . " and "Resumes" inside simple envelope icons 123 and 127 instead of the graphics 110 and 114 (step 122). However, if no alternate text is specified (decision 120) as is the case for graphics 108 and 112, then the client displays respective simple envelope icons 121 and 125 instead of the actual graphics 108 and 112, respectively (step 124). After step 122 or 124, the client returns to decision 106 to process the next graphic, if any, in the html.

Thus, if the user selects "graphics on", all graphics, all regular text (but not alternate text) and the horizontal lines are displayed as the web page. However, if the user selects "graphics off", all regular text, all alternate text, if any, and the horizontal lines are displayed but no graphics are displayed; however, simple icons, if any, are displayed instead of the graphics when no alternate text is specified for the graphics.

While the foregoing technique for selectively displaying web pages with or without graphics permits the user to selectively avoid the delay caused by loading complex graphics, a problem may arise if the graphics provide single or multiple click points and there is no alternate text(s) to inform the user of the function of the single or multiple click points. While the simple icon can serve as a click point in those cases where there is no alternate text, the simple icon does not indicate the consequence of selecting the icon, i.e. to what URL the icon is linked.

Accordingly, a general object of the present invention is to permit a user to control the amount of graphics to load, but ensure that the user loads all graphics necessary to fully understand all click points and utilize the web page.

SUMMARY OF THE INVENTION

The invention resides in a computer system for selectively loading graphics for a web page. The user selects graphics on, graphics off or necessary graphics. In response to the user selection of graphics on, the system selects to display a web page with regular text and graphics associated with the web page. In response to the user selection of graphics off, the system selects to display a web page with regular text, without graphics and with alternate text, if any, for the graphics. In response to user selection of necessary graphics, the system selects to display a web page with regular text, without nonclickable graphics, without clickable graphics that have alternate text, with the alternate text, with clickable graphics that do not have alternate text. Thus, all graphics necessary to know the consequence of selecting a hot link, i.e. those graphics for which there is no alternate text, are displayed. In those cases where the system does not display a graphic, the system displays a simple icon instead of the graphic.

In accordance with another feature of the present invention, the system will display a graphic with multiple click points regardless of whether there is alternate text. This is because such alternate text will not ordinarily describe all click points in sufficient detail.

In accordance with another feature of the present invention, in response to the user selection of necessary graphics, the system will also display background images, if any, which are necessary for text readability.

DETAILED DESCRIPTION OF THE PREFERRED EMBODIMENTS

Figure 4:
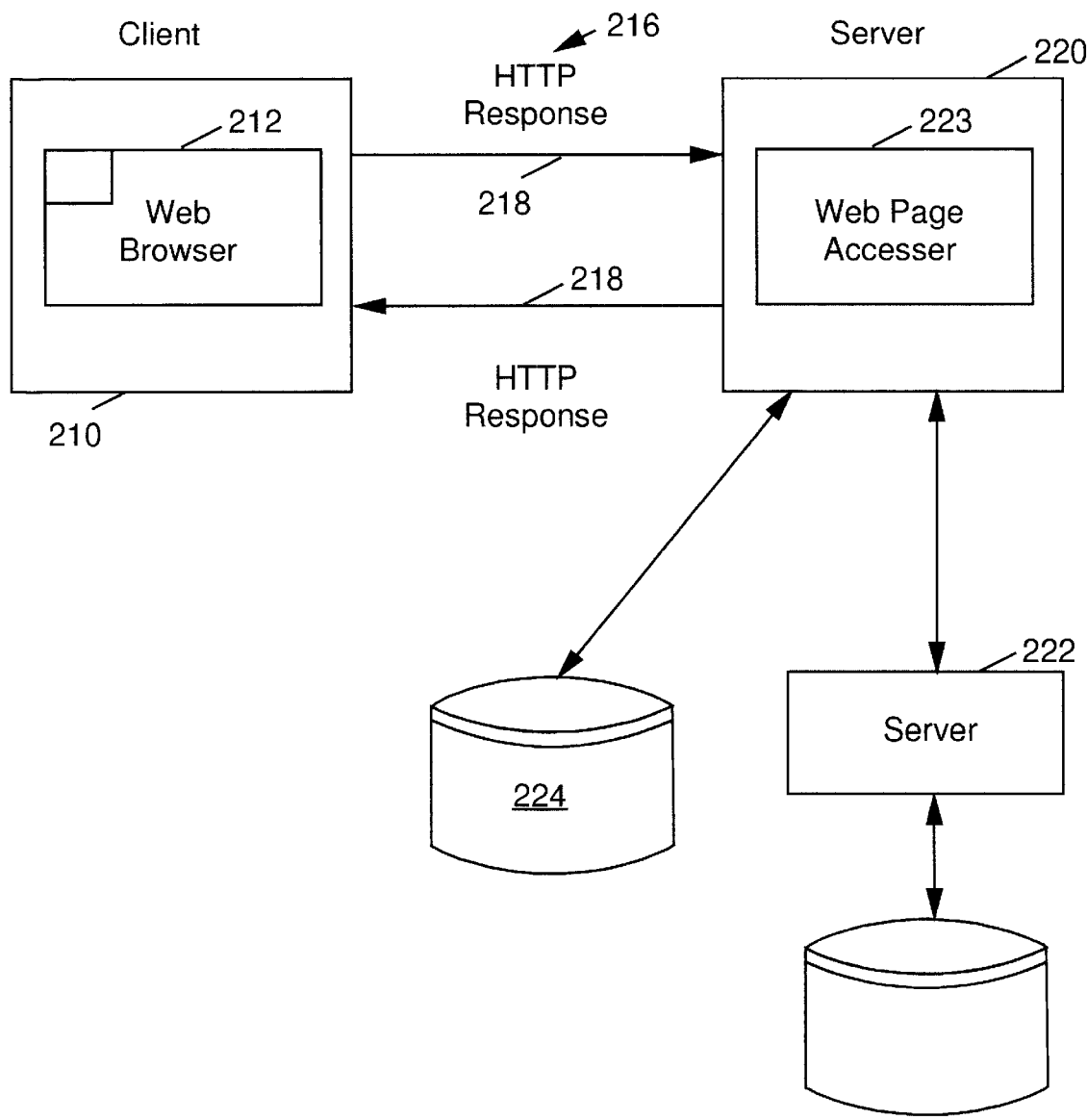
FIG. 4 is a block diagram illustrating a web browser according to the present invention and a web page server and associated DASD according to the prior art.

Referring now to the drawings in detail wherein like reference numbers indicate like elements throughout, FIG. 4 illustrates a client computer generally designated 210 according to the present invention. Client computer 210 comprises a web browser program 212 and a memory 214 to store web pages. Web browser 212 provides the user interface and controls the display of web pages and other results to the user. Client 210 is coupled to WWW 216 via communication lines 218 such as telephone or fiberoptics. The WWW includes a multitude of servers, such as servers 220 and 222 shown. Server 220 includes a web page accessing program function 223 to access web pages from disk 224 on behalf of client 210 or request web pages from server 222 on behalf of client 210. In the illustrated example, client 210 communicates with server 220 using http access method. When server 220 returns a web page, the web page is defined by an html file which is embedded in the http communication.

Figure 5A:
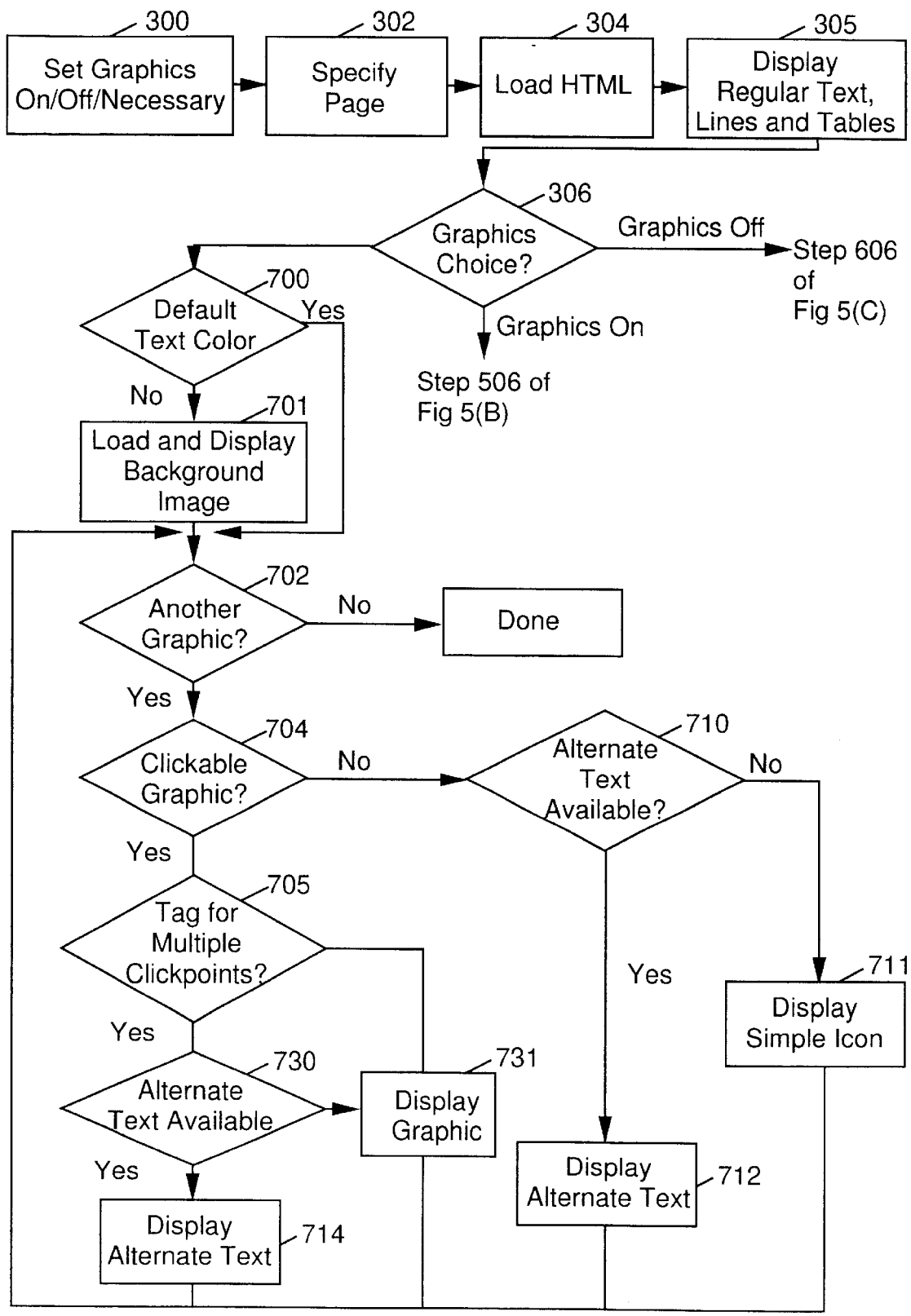
FIGS. 5(a,b,c) form a flow chart illustrating processing by the web browser of FIG. 4 to load a web page according to "graphics on", "graphics off" and "necessary graphics only" preferences by a user.
Figure 5B:
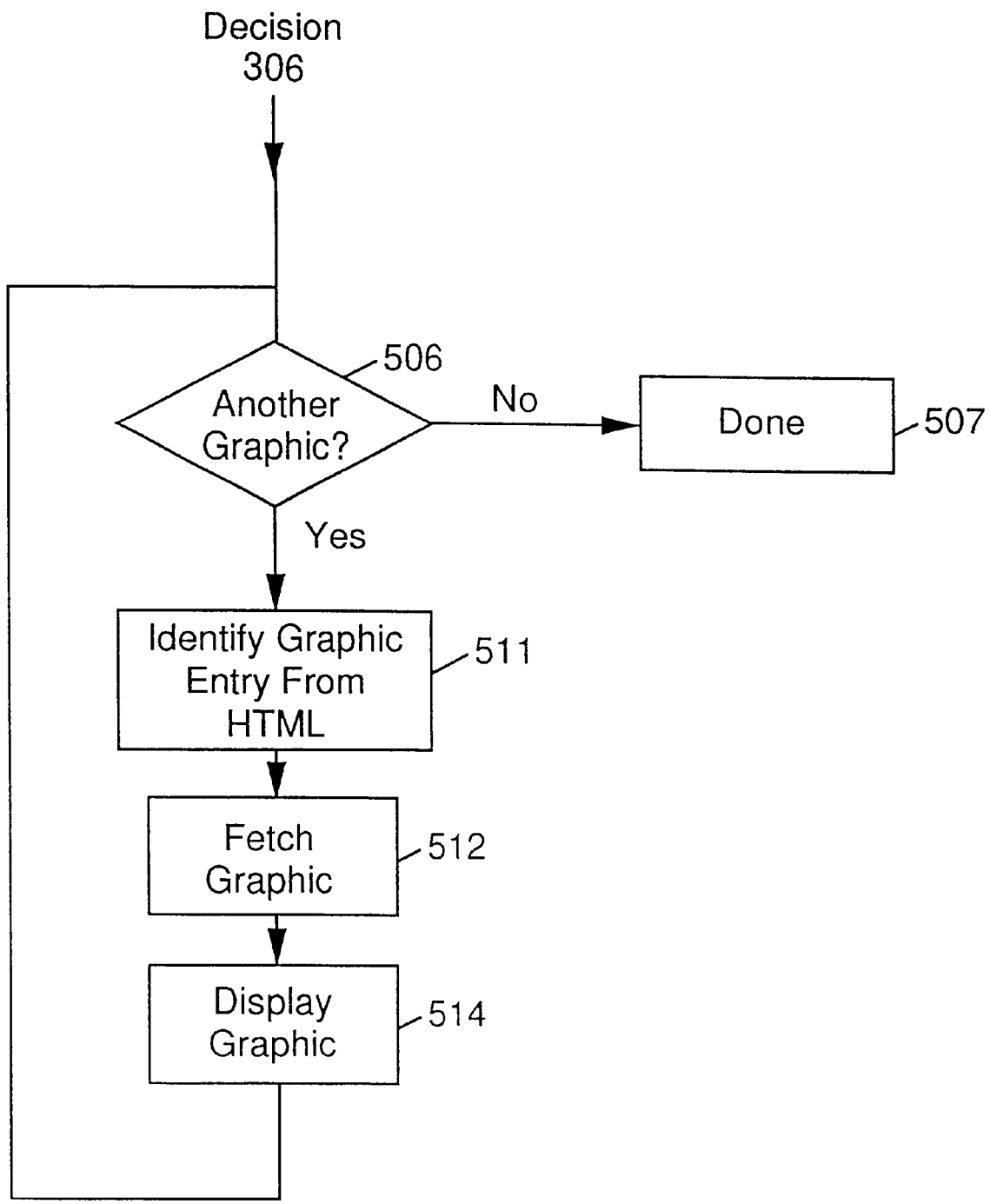
Figure 5C:
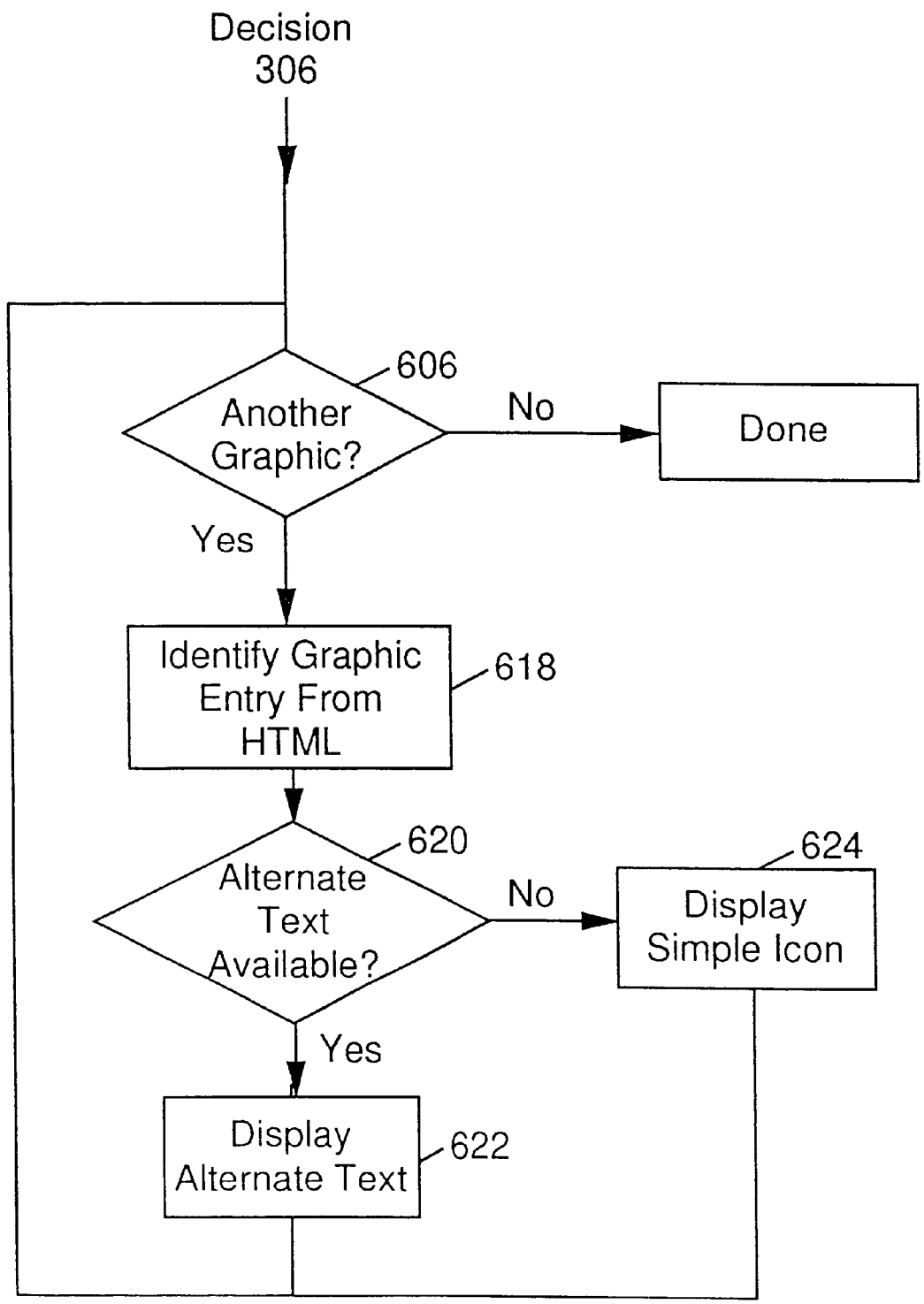

FIGS. 5(a–c) illustrate processing according to the present invention. In step 300, the user specifies parameters for web browser 212. The parameters include the choice of graphics for download—all graphics on, all graphics off or necessary graphics only. As described in more detail below, the "necessary" graphics are those which serve as click points do not have alternate text. Necessary graphics also include background images necessary for text readability or graphics which are necessary for any application requirements. Next, the user specifies by URL a web page to be loaded (step 302). Next, the server which is responsible for the URL, for example, server 220 sends the html for the web page to client 210 (step 304). Next, the web browser displays the regular text (but not the alternate text) and the horizontal lines from the html (step 305). Next, the web browser reads the user specified web browser parameters to determine the user's graphics choice (decision 306).

Figure 1:
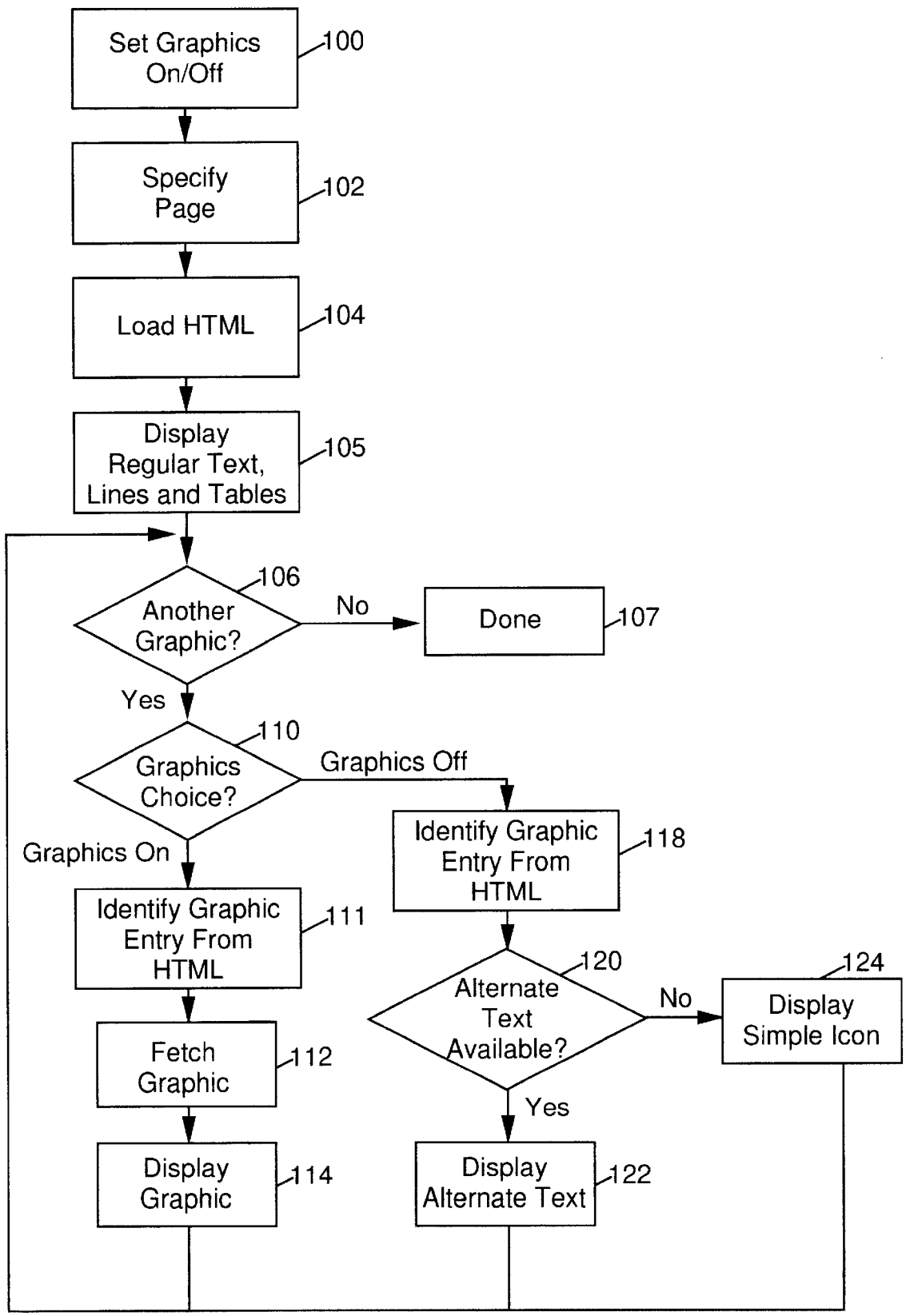
FIG. 1 is a flow chart illustrating prior art processing by a web browser to load a web page according to "graphics on" and "graphics off" preferences by a user.

The case of "graphics on" is handled similarly to the "graphics on" case in the prior art of FIG. 1. The web browser determines if there is a graphic yet to be read from the html (decision 506). This is done by scanning down the html looking for a "<IMG" tag. If not, then the display is complete (step 507). However, if there is a graphic yet to be displayed, the web browser reads the file name of the first graphic from the html (step 511). In the illustrated example, the first graphic is graphic 108, and graphic 108 is defined by the file name "pics/icons/smiley.gif". Then, the web browser loads the graphic from the URL indicated by the pointer (step 512). Then, the web browser displays the first graphic on the web page along with the text and horizontal lines that were previously displayed in step 105 (step 514). If the html specifies another graphic (decision 506), then the client repeats steps 511, 512 and 514 until all graphics are displayed. In the illustrated example, steps 511, 512 and 514 are repeated for graphics 110, 112 and 114.

Referring again to decision 306, if the web browser parameters indicate "graphics off" (instead of "graphics on" as previously discussed), then after the web browser displays the regular text and graphics of the web page in step 305, the web browser determines if there is a graphic yet to be displayed (decision 606). If so, the web browser reads the specification of the first graphic (step 618) and determines if alternate text is specified (decision 620). If so, as illustrated for graphics 110 and 114, the client displays the respective alternate texts "Photo not displayed . . . " and "Resumes" inside simple envelope icons 123 and 127 instead of the graphics 110 and 114 (step 622). However, if no alternate text is specified (decision 620) as is the case for graphics 108 and 112, then the client displays respective simple envelope icons 121 and 125 instead of the actual graphics 108 and 112, respectively (step 624). After step 622 or 624, the client returns to decision 606 to process the next graphic, if any, in the html.

Figure 2:
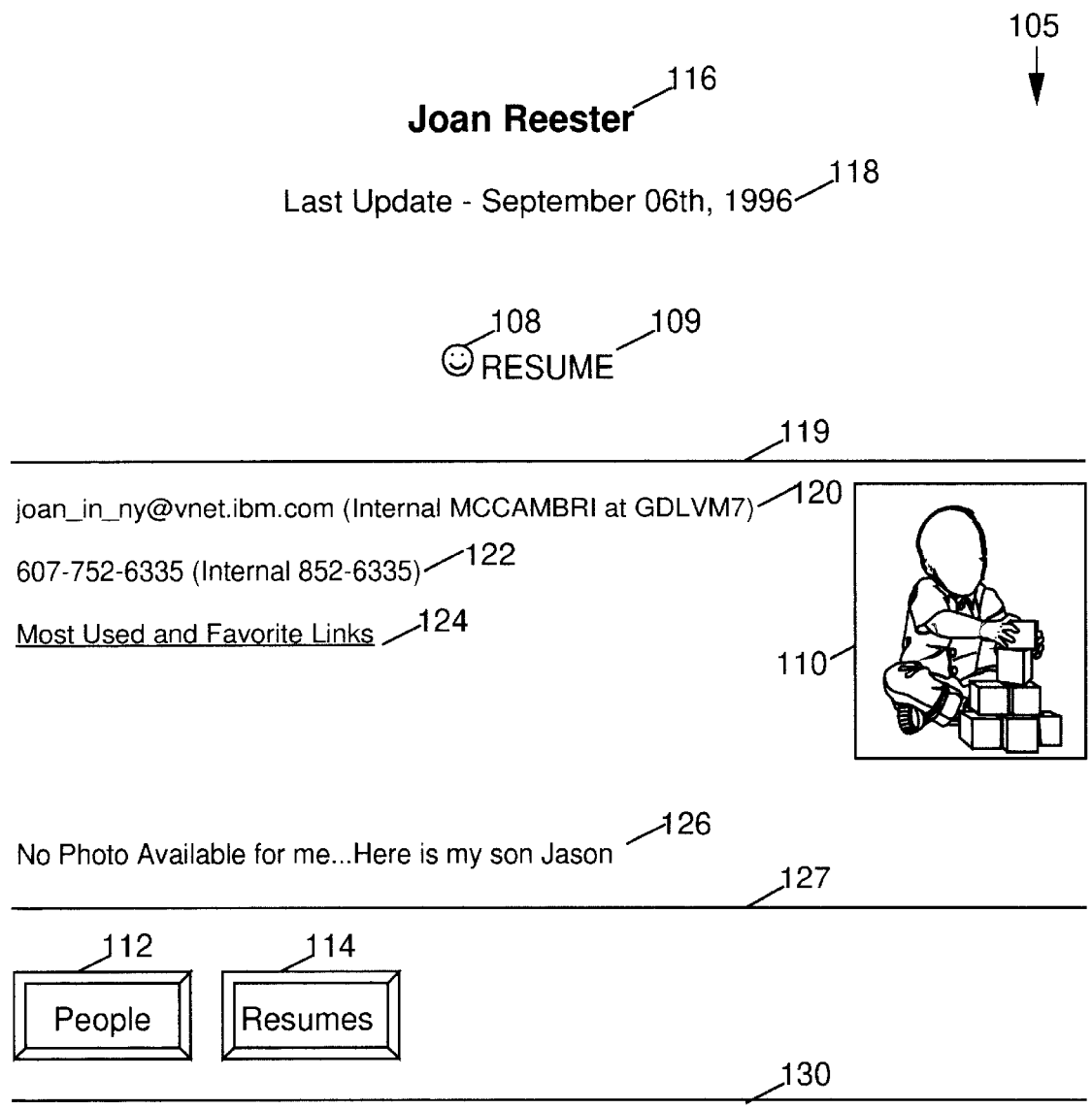
FIG. 2 illustrates a display of a prior art web page according to the "graphics on" preference of FIG. 1.
Figure 3:
FIG. 3 illustrates a display of a prior art web page according to the "graphics off" preference of FIG. 1.
Figure 3:
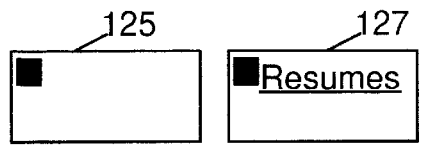

Thus, if the user selects "graphics on", all graphics, all regular text (but not alternate text) and the horizontal lines are displayed as the web page as illustrated in FIG. 2. However, if the user selects "graphics off", all regular text and all alternate text, if any, and the horizontal lines are displayed but no graphics are displayed as illustrated; however, simple icons, if any, are displayed instead of the graphics when no alternate text is specified for the graphics. The "graphics off" case is illustrated in FIG. 3.

Referring again to decision 306, the third graphics choice "necessary graphics only" represents processing according to the present invention. In step 700, web browser 212 determines if the color of the text is such that the text would be visible with or without a background image. (Some text is not visible without a background image in which case the background image is necessary.) If not, then the web browser loads and displays the background image (step 701). However, if the text would be visible without a background image, if any, then the web browser does not load or display a background image, if any.

Figure 6:
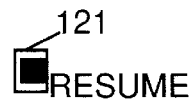
FIG. 6 illustrates a display of a web page according to the "necessary graphics only" preference of FIG. 5(a).
Figure 6:
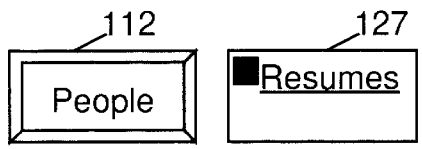

After step 701 or the yes leg of decision 700, the web browser determines if there is a graphic yet to be displayed (decision 702). This is done by reading down the html tags looking for the first entry with a graphics tag "IMG". In the illustrated example, the first such graphics entry is 143. Then, web browser 212 determines if entry 143 is clickable, i.e also includes a hot link (or anchor) tag "<a" (decision 704). In the illustrated example, entry 143 does not include a hot link tag because graphic 108 is not clickable. Therefore, web browser reads entry 143 further to determine if entry 143 also includes alternate text as indicated by an alternate text tag "ALT" (decision 710). However, this is not the case in the illustrated example for graphic 108 so web browser 212 displays the simple envelop graphic 121 without any alternate text in place of the graphic 108 as illustrated in FIG. 6 (step 711). In accordance with the present invention, display of the simple envelope icon under these conditions does not deprive the user of necessary information because the graphic 108 was not clickable.

Next, web browser 212 reads further down the html looking for another graphic tag "IMG" (decision 702). In the illustrated example, entry 150 for graphic 110 includes the next graphic tag, "IMG" (decision 702). However, in this case, entry 150 does not include the "<a>" tag and consequently, entry 150 does not define a clickable graphic (decision 704). Web browser 12 next reads entry 150 to determine if entry 150 includes any alternate text (decision 710). In the illustrated example, entry 150 includes the "ALT" tag and therefore contains alternate text. Therefore, web browser 212 proceeds to step 712 to display the simple envelop icon with alternate text "Photo not displayed . . . ".

Next, web browser 212 reads further down the html and identifies entry 186 as containing the next "IMG" tag (decision 702). Web browser 212 also determines that entry 186 defines a clickable graphic by the "<A" tag (decision 704). Web browser 212 next reads entry 186 to determine if entry 186 includes an "ISMAP" tag to indicate a graphic with multiple click points (decision 705). Entry 186 does not include the "ISMAP" tag, so web browser 212 next reads entry 186 to determine if entry 186 includes any alternate text (decision 730). In the illustrated example, entry 186 does not include the "ALT" tag and therefore does not contain alternate text. Therefore, in accordance with the present invention, the graphic 112 corresponding to entry 186 is displayed because it is necessary (step 731).

Next, web browser 212 reads further down the html and identifies entry 188 as containing the next "IMG" tag (decision 702). Web browser 212 also determines that entry 188 defines a clickable graphic by the "<A" tag (decision 704) but not the "ISMAP" tag to indicate multiple click points (decision 705). Web browser 212 next reads entry 188 to determine if entry 188 includes any alternate text (decision 730). In the illustrated example, entry 188 includes the "ALT" tag and therefore contains alternate text. Therefore, in accordance with the present invention, the web browser displays the simple envelop icon 127 with the alternate text "Resumes" corresponding to entry 188; the graphic 114 is not necessary (step 714).

The following is an html entry for a graphic which has multiple click points and alternate text:

800. <A HREF="http://my.test.page/test.html"><IMG SRC="test.gif" ALT="education" ISMAP ></A>

The only difference between the format of this entry and that of a graphic with a single click point is the tag "ISMAP". This tag references a file containing one line for each clickable area in the graphic. Html entry 800 is also handled by the web browser 212 according to the flow chart of FIG. 5(a–c). If the user selects graphics on, then all graphics are displayed including the graphic with multiple click points. If the user selects graphics off, then no graphics are displayed; instead, the envelop icons and any alternate text are displayed instead of the graphics. If the user selects necessary graphics only, then after steps 700 and 701, the web browser 212 reads the html 800 and determines that entry 800 contains the "IMG" tag (decision 702). Web browser 212 also determines that entry 800 defines a clickable graphic by the "<A" tag (decision 704) and defines multiple click points by the "ISMAP" tag (decision 705). Therefore, web browser 212 proceeds to step 731 to display the graphic with multiple click points regardless of whether the html includes alternate text because ordinarily the alternate text will not adequately describe all click points. Therefore, the graphic with multiple click points is deemed "necessary" regardless of alternate text.

The following is an html entry for the same graphic as above which has multiple click points but no alternate text:

804. <A HREF="http://my.test.page/test.html"><IMG SRC="test.gif" ISMAP ></A>

Html entry 804 is handled by the web browser 212 according to the flow chart of FIG. 5(a–c) the same as entry 800. If the user selects graphics on, then all graphics are displayed including the graphic with multiple click points. If the user selects graphics off, then no graphics are displayed; instead, the envelop icons and any alternate text are displayed instead of the graphics. If the user selects necessary graphics only, then web browser 212 displays the necessary graphics including the graphic corresponding to entry 804.

It is also possible to implement a graphic with multiple click points without the "ISMAP" tag. In this implementation, when the user clicks on a point on the image, the client sends the coordinate of that point to the server, and the server correlates the click point to a respective web page to furnish the client. In this implementation, the html for the graphic with multiple click points is identical to the html for the graphic without multiple click points, i.e., does not include the "ISMAP" tag. Therefore, the web browser will not know that the graphic has multiple click points. Therefore, this implementation is also processed according to FIGS. 5(a–c) in the same manner as graphics without multiple click points. If there is alternate text, the alternate text will be displayed instead of the graphic with multiple click points. If there is no alternate text, then the graphic with multiple click points will be displayed.

Based on the foregoing, a web browser according to the present invention has been disclosed. However, numerous modifications and substitutions can be made without deviating from the scope of the present invention. For example, the ordering of the steps in FIG. 5(a) can be modified such that step 305 (display of regular text) can be performed after step 701 or even later. Also, the web browser can process the html line-by-line, i.e., decide whether the regular text, alternate text or graphics on each line should be displayed according to the same rules for display as described with reference to FIG. 5. Also, there may be other types of graphics which are "necessary" to a client application or server application, besides those which are clickable and do not have alternate text. In such a case, user selection of "necessary graphics only" would cause the web browser to display these other types of necessary graphics. If desired, the web browser can present only two options to the user— "graphics on" and "necessary graphics only". (Even if the web browser calls the latter option—"graphics off", if the web browser displays necessary graphics in response to the latter option, then this option is considered "necessary graphics only".) This two option embodiment is also handled by the flow charts of Figures (a–c) except that steps 606–624 will not be used. Therefore, the present invention has been disclosed by way of illustration and not limitation and reference should be made to the following claims to determine the scope of the present invention.

What is claimed is:

1. A computer system for selectively loading graphics for a web page having regular text, nonclickable graphics, clickable graphics that have alternate text, said alternate text, and clickable graphics that do not have alternate text, said system comprising:

means for user selecting an option to load only necessary graphics; and means, responsive to user selecting the option to load only necessary graphics, for selecting to display said web page with said regular text, without said nonclickable graphics, without said clickable graphics that have alternate text, with said alternate text, and with said clickable graphics that do not have alternate text.

2. A system as set forth in claim 1 wherein said web page includes a background image and further comprising:

means for determining if said regular text is visible without said background image, and if not, selecting to display said background image in response to user selection of necessary graphics.

3. A system as set forth in claim 1 wherein the means responsive to user selecting the option to load only necessary graphics selects to display an icon for a clickable graphic for which there is alternate text.

4. A system as set forth in claim 1 wherein the means responsive to user selecting the option to load only necessary graphics selects to display an icon for a nonclickable graphic for which there is alternate text.

5. A system as set forth in claim 1 wherein the means responsive to user selecting the option to load only necessary graphics selects to display an icon for a nonclickable graphic for which there is no alternate text.

6. A system as set forth in claim 1 further comprising means for requesting an html for said web page and wherein the means, responsive to user selecting the option to load only necessary graphics reads said html to identify the regular text, graphics, alternate text and whether the graphics are clickable.

7. A system as set forth in claim 6 wherein said html includes the regular text, alternate text, indications whether said graphics are clickable, and pointers to said graphics.

8. A system as set forth in claim 1 further comprising means for requesting an html for said web page and wherein said html includes the regular text, alternate text, indications whether said graphics are clickable, and pointers to said graphics.

9. A system as set forth in claim 1 wherein said web page includes a graphic with two or more click points and alternate text for said graphic with two or more click points, and the means responsive to user selecting the option to load only necessary graphics selects to display said graphic with two or more click points even though there is alternate text for said graphic with two or more click points.

10. A computer system for selectively loading graphics for a web page having regular text, nonclickable graphics, clickable graphics that have alternate text, said alternate text, and clickable graphics that do not have alternate text, said system comprising:

means for selecting graphics on, graphics off or clickable graphics that do not have alternate text;

means, responsive to selection of graphics on, for selecting to display said web page with said regular text and all of said graphics associated with the web page;

means, responsive to selection of graphics off, for selecting to display said web page with said regular text, without any of said graphics and with said alternate text; and means, responsive to selection of clickable graphics that do not have alternate text, for selecting to display said web page with said regular text, without said nonclickable graphics, without said clickable graphics that have alternate text, with said alternate text, and with said clickable graphics that do not have alternate text.

11. A method for selectively loading graphics for a web page having regular text, nonclickable graphics, clickable graphics that have alternate text, said alternate text, and clickable graphics that do not have alternate text, said method comprising the steps of:

user selecting an option to display only necessary graphics; and in response to user selecting the option to display only necessary graphics, automatically selecting to display said web page with said regular text, without said nonclickable graphics, without said clickable graphics that have alternate text, with said alternate text, and with said clickable graphics that do not have alternate text.

12. A method as set forth in claim 11 wherein said web page includes a background image and further comprising the step of:

determining if said regular text is visible without said background image, and if not, automatically selecting to display said background image in response to user selection of only necessary graphics.

13. A method as set forth in claim 11 wherein, in response to user selecting the option to display only necessary graphics, automatically selecting to display an icon for a clickable graphic for which there is alternate text.

14. A method as set forth in claim 11 wherein, in response to user selecting the option to display only necessary graphics, automatically selecting to display an icon for a nonclickable graphic for which there is alternate text.

15. A method as set forth in claim 14 wherein said web page includes said regular text, said alternate text, indications whether said graphics are clickable, and pointers to said graphics.

16. A method as set forth in claim 11 wherein, in response to user selecting the option to display only necessary graphics, automatically selecting to display an icon for a nonclickable graphic for which there is no alternate text.

17. A method as set forth in claim 11 further comprising the steps of receiving an html for said web page and reading said html to identify the regular text, graphics, alternate text and whether the graphics are clickable.

18. A computer program product for selectively loading graphics for a web page having regular text, nonclickable graphics, clickable graphics that have alternate text, said alternate text, and clickable graphics that do not have alternate text, said computer program product comprising:

a computer readable medium;

first program product means for receiving a user selection of an option to display only necessary graphics; and second program product means, responsive to user selecting the option to display only necessary graphics, for instructing a processor to automatically display said web page with said regular text, without said nonclickable graphics, without said clickable graphics that have alternate text, with said alternate text, and with said clickable graphics that do not have alternate text; and wherein said first and second program instruction means are recorded on said medium.

\* \* \* \* \*